United States Patent

[11] 3,602,206

| [72] | Inventors | Werner Kern<br>Stuttgart-bad Cannstatt;<br>Friedrich-Wilhelm Hase, Stuttgart-bad Cannstatt; Hartmut Glatzel, Stuttgart-Rohracker, all of, Germany |
|---|---|---|
| [21] | Appl. No. | 796,851 |
| [22] | Filed | Feb. 5, 1969 |
| [45] | Patented | Aug. 31, 1971 |
| [73] | Assignee | Daimler-Benz Aktiengesellschaft<br>Stuttgart-Unterturkheim, Germany |
| [32] | Priority | Feb. 7, 1968 |
| [33] | | Germany |
| [31] | | P 16 01 345.9 |

[54] FLAME HEATER PLUG FOR AIR-COMPRESSING INTERNAL COMBUSTION ENGINES
23 Claims, 4 Drawing Figs.

[52] U.S. Cl. .................................................. 123/122 G,
       123/122 AC, 123/122 F, 123/143 A, 123/179 H
[51] Int. Cl. .................................................. F02m 31/12
                                                          F02m 31/16
[50] Field of Search .......................................... 123/179 H,
       122 G, 122 F, 122 A, 143 A, 143 B, 145 A

[56] References Cited
UNITED STATES PATENTS

| 1,483,177 | 2/1924 | Hunt et al. | 123/122 |
| 1,626,061 | 4/1927 | Woolson | 123/122 |
| 3,353,520 | 11/1967 | Haag | 123/179 |

FOREIGN PATENTS

| 118,622 | 9/1919 | Great Britain | 123/122 |
| 191,025 | 12/1922 | Great Britain | 123/122 |
| 801,774 | 9/1958 | Great Britain | 123/122 |
| 276,643 | 11/1913 | Germany | 123/122 |

*Primary Examiner*—Mark M. Newman
*Assistant Examiner*—Ronald B. Cox
*Attorney*—Craig, Antonelli, Stewart and Hill ABSTRACT: A flame heater-plug for air-compressing internal combustion engines which is arranged in the suction pipe and has at least one heater element; the part of the plug projecting into the suction pipe is surrounded by a protective cap that is open in the direction toward the internal combustion engine and is closed in the other direction.

INVENTORS
WERNER KERN
FRIEDRICH-WILHELM HASE
HARTMUT GLATZEL

BY *Craig, Antonelli, Stewart & Hill*
ATTORNEYS

FLAME HEATER PLUG FOR AIR-COMPRESSING INTERNAL COMBUSTION ENGINES

The present invention relates to a flame glow-plug or heater-plug for air-compressing internal combustion engines which is arranged in the suction pipe thereof and which includes at least one glow or heater element that is adapted to be heated and is connected with the fuel supply system.

Flame glow-plugs or heater-plugs of the aforementioned type are known per se in the prior art. They serve in particular with direct-injecting engines for the purpose of facilitating the cold start or for the purpose of facilitating the heating-up and for the purpose of shortening the heating-up phase of the engine. Difficulties reside first of all in the accommodation of a sufficient output in the flame glow-plug or heater-plug, above all in the fact that the flame under certain circumstances burned or flamed out.

The present invention aims at eliminating these disadvantages. It solves the underlying problems with the flame glow-plugs or heater-plugs of the aforementioned type in that the part of the plug projecting into the suction pipe is surrounded by a protective cap which is open on the side toward the internal combustion engine but is closed, in contrast, toward the other side. A burn-out of the flame can be avoided with certainty by the protective cap in accordance with the present invention. Additionally, there exists the possibility to achieve by a special construction of this protective cap and possibly by additional measures, an intensive vortexing or eddying of the supplied fuel with the suction air and therewith an intensive combustion.

In one type of construction according to the present invention, the protective cap is secured itself at the wall of the suction pipe and surrounds the bore intended for the installation of the plug. This type of construction offers the advantage that the protective cap remains once and for all in the correct predetermined position within the suction pipe. In another type of construction according to the present invention, the protective cap is secured at the plug body itself.

It is additionally proposed by the present invention that the protective cap extends approximately up to half the plug cross section. Of course, it is still within the purview and scope of the present invention to extend or draw the protective cap further toward the side facing the engine beyond this center plane of the plug. Similarly, it is possible to construct the protective cap in the manner of a closed cylinder and to provide the same on the side facing the engine exclusively with a large aperture of, for example, oval shape.

A further feature of the present invention resides in that the protective cap is provided at its end with a closed bottom. This bottom is normally disposed approximately in proximity to the ends of the glow or heater elements. However, it may be appropriate in special cases if according to another feature of the present invention, the protective cap projects with its ends or with its bottom a considerable amount beyond the end of the heater element or elements. In this manner an air volume screened or shielded with respect to the suction flow results below the ends of the heater elements so that a completely satisfactory ignition and flame-holding is assured. The height of this projecting part may be approximately equal to the length of the heater element.

It is then further proposed by the present invention to provide the protective cap with at least one small aperture on the side facing the suction filter. Also, this measure serves for the improvement of the vortexing or eddying and therewith of the ignition. It would also be possible to provide or mount special rim parts and eddying edges at the edges of the protective cap or at the edges of the protective cap aperture.

Flame heater-plugs are known in the prior art which include more than one glow or heater element. With such types of flame heater-plugs having at least two heater elements, the present invention proposes—and this proposal is applicable independently of or in conjunction with the aforementioned features—that less fuel or preferably no fuel is adapted to be supplied to the first heater element, whereas, more fuel is adapted to be supplied to the other heater elements. In this manner it is attained that the ignition is achieved with certainty by means of one heater element whereas the other heater element or elements serve for the evaporation of the fuel. In that connection it is additionally proposed that the first heater element is arranged in the plug on the side facing the internal combustion engine.

Accordingly, it is an object of the present invention to provide a flame heater-plug for air-compressing internal combustion engines which avoids by simple means the aforementioned shortcomings and drawbacks encountered in the prior art.

Another object of the present invention resides in a flame heater-plug of the type described above which avoids with certainty a burnout of the flame.

A further object of the present invention resides in a heater-plug which produces an intensive vortexing of the supplied fuel with the suction air and therewith an intensive combustion.

A still further object of the present invention resides in a heater-plug of the type described above which can be readily installed and also effects improved operation of the engine.

These and further objects, features and advantages of the present invention will become more obvious from the following description, when taken in connection with the accompanying drawing, which shows, for purposes of illustration only, two embodiments in accordance with the present invention.

Figure 1:
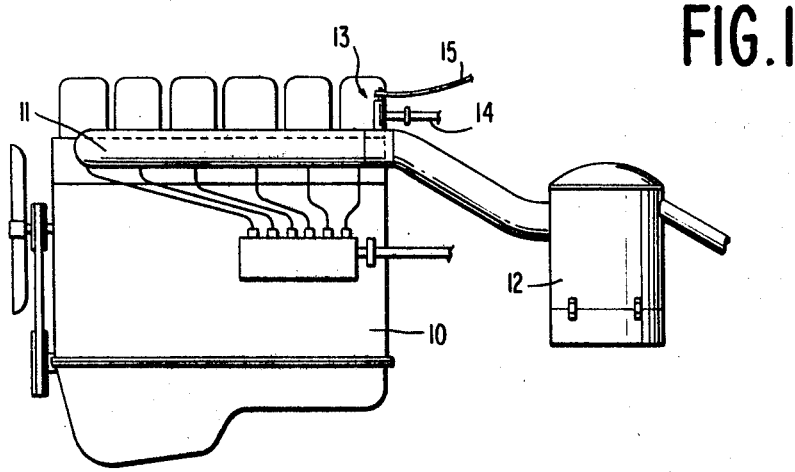
FIG. 1 is a schematic side elevational view of the arrangement of a flame heater-plug in the suction part of an engine in accordance with the present invention.

Referring now to the drawing wherein like reference numerals are used throughout the various views to designate like parts, and more particularly to FIG. 1, reference numeral 10 designates therein an air-compressing internal combustion engine of conventional construction to which the air is supplied by way of the suction pipe 11. A conventional filter 12 is disposed at the end of the suction pipe 11. A flame heater-plug or glow-plug 13 is disposed in the suction pipe 11—and more particularly at the place up-stream of the branching-off of the individual suction connections leading to the cylinders. The flame heater-plug 13 is inserted into the suction pipe 11 either suspended or possibly laterally. The heater-plug 13 is connected by way of a line 14 with a fuel supply and by way of a line 15 with a current source for the purpose of heating. The flame heater-plug 13 is inserted into the suction pipe conventionally in the manner of a spark plug by means of a threaded adapter nipple and includes, for example, three heater elements whose constructions and details are conventional and therefore not of significance for the present invention.

Figure 2:
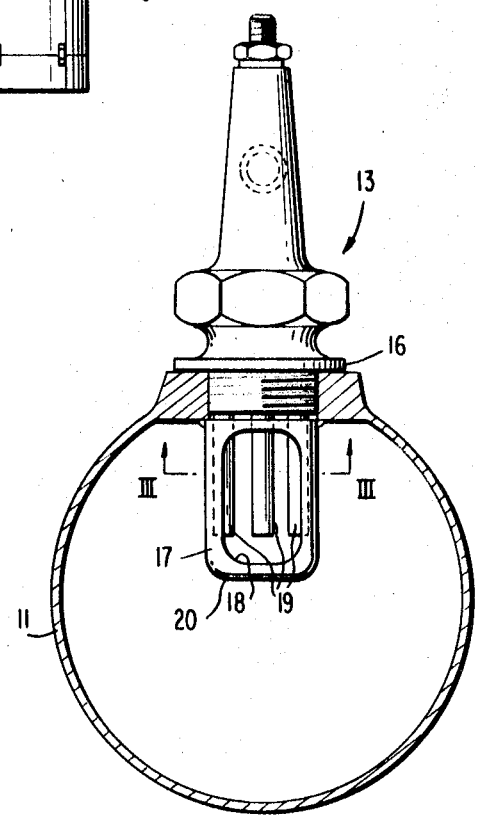
FIG. 2 is an elevational view of the flame heater-plug in accordance with the present invention within the suction pipe.

According to FIG. 2, a flange 16 or a similar flangelike part is arranged in the suction pipe 11 for the installation of the flame heater-plug 13. This flange part 16 passes over inwardly into a protective cap 17 which is constructed as a pot-shaped cylinder part closed in itself. This protective cap 17 has an approximately oval cutout 18 on the side facing the engine in the suction pipe. The protective cap 17 surrounds the three heater elements 19 of the flame heater-plug 13 and shields the same against the suction air flowing in the direction toward the engine. An air volume remains between the bottom 20 of the protective cap 17 and the end of the heater elements 19 which can be still further increased if the bottom 20 is still spaced further from the end of the heater elements 19. A good ignition and a good flame holding at the heater elements 19 is achieved by this air volume and by the shielding by means of the protective cap 17.

Figure 3:
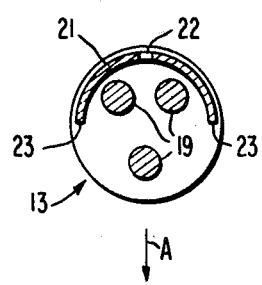
FIG. 3 is a cross-sectional view, taken along line III—III of FIG. 1, through another embodiment of a flame heater plug in accordance with the present invention.

According to FIG. 3, the flame heater plug 13 has three heater elements 19 which are surrounded by a protective cap 21 up to the center plane of the heater plug. This protective cap 21 is now secured at the plug body itself. Its position in the suction pipe, however, corresponds to that according to FIGS. 1 and 2, which is indicated by the arrow A that indicates the suction direction of the air. The protective cap 21 is provided with a small aperture 22 on the side facing the air filter.

In this manner a better eddying and vortexing of the air volume surrounding the heater elements 19 is achieved and it is assured that no lack of oxygen can occur at this place. For this purpose, the edges 23 of the protective cap 21—and as to the rest also those of the other protective caps described herein—may be provided additionally or exclusively with additional measures, for example, with slotted flange structures for the purpose of improved air eddying.

Figure 4:
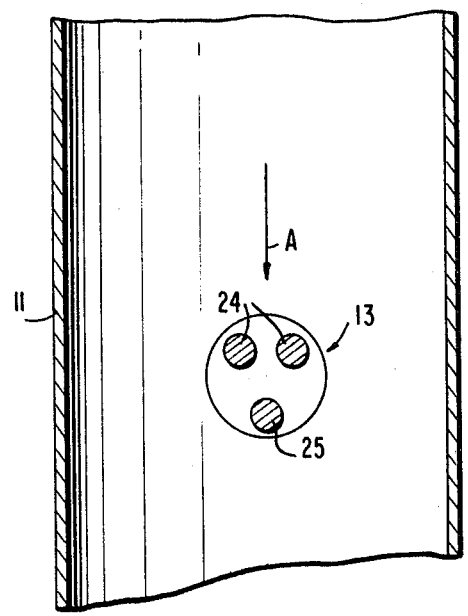
FIG. 4 is a cross-sectional view through a suction pipe with still another embodiment of a flame heater-plug in accordance with the present invention, with the cross section being taken in the same plane as in FIG. 3.

According to FIG. 4, the heater-plug 13 is again arranged in the suction pipe 11 in the manner described above. It includes again three heater elements, of which, however, two heater elements 24 serve for the supply of fuel, whereas the heater element 25 serves exclusively for heating purposes or possibly for the supply of a very small amount of fuel. The arrangement is thereby made in such a manner that the last-mentioned heater element 25 is on the side of the heater plug 13 facing the engine. In this manner the fuel evaporated by the heater elements 24 is forcibly torn along the heater element 25 by the suction flow—indicated as to direction by the arrow A and is thereby ignited with certainty. Similarly, the flame is maintained with certainty. The protective caps 17 and 21 may be arranged at such a heater plug 13 in the manner described above. However, it is also possible without any difficulty to utilize such an arrangement or a similar arrangement of differently constructed or differently operating heater elements without protective cap.

While we have shown and described only two embodiments in accordance with the present invention, it is understood that the same is not limited thereto but is susceptible of numerous changes and modifications as known to a person skilled in the art and we therefore do not wish to be limited to the details shown and described herein but intend to cover all such changes and modifications as are within the scope of those skilled in the art.

We claim:

1. A flame heater-plug for air-compressing internal combustion engines which is arranged in the suction pipe thereof and includes heater means adapted to be heated and connected with the fuel supply system, characterized in that the part of the heater-plug projecting into the suction pipe is surrounded by a protective cap means open on the side leading toward the internal combustion engine and substantially closed toward the opposite side, and in that the heater means in said plug includes at least two heater elements, a relatively very small amount of fuel being adapted to be supplied to a first one of said heater elements while a substantially greater amount of fuel is adapted to be supplied to a second of said heater elements.

2. A flame heater-plug according to claim 1, wherein the protective cap means extends only approximately up to half the plug cross section.

3. A flame heater-plug according to claim 1, wherein the protective cap means is provided with at least one small aperture on the side facing the suction filter.

4. A flame heater-plug according to claim 1, wherein the protective cap means is provided at its end with a closed bottom.

5. A flame heater-plug according to claim 4, wherein the protective cap means projects beyond the end of the heater element by a considerable amount.

6. A flame heater-plug for air-compressing internal combustion engines which is arranged in the suction pipe thereof and includes at least two heater elements adapted to be heated and connected with the fuel supply system, characterized in that the part of said heater-plug projecting into the suction pipe is surrounded by a protective cap means open on the side leading toward the internal combustion engine and substantially closed toward the opposite side, and in that no fuel is supplied to a first one of said heater elements while fuel is adapted to be supplied to a second of said heater elements.

7. A flame heater-plug according to claim 6, wherein several heater elements are provided to which relatively more fuel is supplied.

8. A flame heater-plug according to claim 7, wherein the first heater element is arranged in the plug on the side facing the internal combustion engine.

9. A flame heater-plug for air-compressing internal combustion engines which is arranged in the suction pipe thereof and includes at least two heater elements adapted to be heated and connected with the fuel supply system, characterized in that the part of the heater-plug projecting into the suction pipe is surrounded by a protective cap means open on the side leading toward the internal combustion engine and substantially closed toward the opposite side, less fuel being adapted to be supplied to a first one of said heater elements while more fuel is adapted to be supplied to a second of said heater elements, and the first heater element being arranged in the plug on the side facing the internal combustion engine.

10. A flame heater-plug according to claim 9, wherein the protective cap means is provided at its end with a closed bottom.

11. A flame heater-plug according to claim 10, wherein the protective cap means projects beyond the end of the heater element by a considerable amount.

12. A flame heater-plug according to claim 11, wherein the protective cap means is provided with at least one small aperture on the side facing the suction filter.

13. A flame heater-plug according to claim 12, wherein the protective means is secured at the walls of the suction pipe and surrounds a bore intended for the installation of the plug.

14. A flame heater-plug according to claim 12, wherein the protective cap means extends only approximately up to half the plug cross section.

15. A flame heater-plug for air-compressing internal combustion engines which is arranged in the suction pipe thereof and includes at least two heater elements adapted to be heated and connected with the fuel supply system, characterized in that substantially no fuel is supplied to one heater element while fuel is supplied to several other heater elements.

16. A flame heater-plug according to claim 15, wherein the one heater element is arranged in the plug on the side facing the internal combustion engine.

17. A flame heater-plug for air-compressing internal combustion engines which is arranged in the suction pipe thereof and includes at least two heater elements adapted to be heated and connected with the fuel supply system, characterized in that the two heater elements are part of and extend together with said plug into the suction pipe, and that a relatively very small amount of fuel is supplied to one heater element while a substantially greater amount of fuel is supplied to the other heater element.

18. A flame heater-plug according to claim 17, characterized in that the part of the heater-plug projecting into the suction pipe includes protective cap means open on the side leading toward the internal combustion engine and substantially closed toward the opposite side, said protective cap means being secured at the walls of the suction pipe and surrounding a bore intended for the installation of the plug so that the protective cap means is always in the correct position with the open side thereof on the side of the engine, regardless of the position of the installed plug.

19. A flame heater-plug for air-compressing internal combustion engines which is arranged in the suction pipe thereof conducting the normal combustion air flow and includes at least two heater elements adapted to be heated and connected with the fuel supply system, characterized in that a respective plug extends into said suction pipe, in that substantially no fuel is supplied to one heater element while fuel is supplied to another heater element, and in that the at least two heater elements form an integral unit with the respective plug.

20. A flame heater-plug according to claim 19, characterized in that the part of the heater plug projecting into the suction pipe includes protective cap means open on the side leading toward the internal combustion engine and substantially closed toward the opposite side, said protective cap means being secured at the walls of the suction pipe and surrounding a bore intended for the installation of the plug so that the protective cap means is always in the correct position with the open side thereof on the side of the engine, regardless of the position of the installed plug.

21. A flame heater-plug for air-compressing internal combustion engines which is arranged in the suction pipe thereof and includes at least two heater elements adapted to be heated and connected with the fuel supply system, characterized in that less fuel is supplied to one heater element while more fuel is supplied to the other heater element, said one heater element being arranged in the plug on the side facing the internal combustion engine.

22. A flame heater-plug for air-compressing internal combustion engines which is arranged in the normal path of flow of the air within the suction pipe thereof and includes heater means adapted to be heated and connection with the fuel supply system, characterized in that the part of the heater plug projecting into the suction pipe is surrounded by a protective cap means open on the side leading toward the internal combustion engine and substantially closed toward the opposite side facing the inflowing air to stabilize the operation of the plug, in that the heater means includes at least one heater element, and in that the protective cap means is fixedly secured at the walls of the suction pipe in such a manner that the open side of the protective cap means is on the side leading toward the internal combustion engine, said protective cap means surrounding a bore intended for the installation of the plug so that the protective cap means is always in its correct position regardless of the position of the installed plug.

23. A flame heater-plug for air-compressing internal combustion engines which is arranged in the suction pipe thereof and includes heater means adapted to be heated and connected with the fuel supply system, characterized in that the part of the heater-plug projecting into the suction pipe is surrounded by a protective cap means open on the side leading toward the internal combustion engine and substantially closed toward the opposite side, and in that the heater means in said plug includes several heater elements, less fuel being adapted to be supplied to a first one of said heater elements while more fuel is adapted to be supplied to several second heater elements.